United States Patent [19]
Amano et al.

[11] Patent Number: 5,585,865
[45] Date of Patent: Dec. 17, 1996

[54] TELEVISION BROADCAST RECEIVER WHICH SELECTS PROGRAMS BY GENRE AND PAST VIEWING HABITS

[75] Inventors: Toshio Amano; Ai Hattori, both of Kanagawa, Japan

[73] Assignee: Sony Corporation, Tokyo, Japan

[21] Appl. No.: 396,392

[22] Filed: Feb. 28, 1995

[30] Foreign Application Priority Data

Mar. 1, 1994 [JP] Japan ................................ 6-031392
Oct. 28, 1994 [JP] Japan ................................ 6-289205

[51] Int. Cl.$^6$ .................................................. H04N 5/50
[52] U.S. Cl. ........................... 348/731; 348/1; 348/734; 348/906
[58] Field of Search ........................... 348/732, 731, 348/734, 461, 467, 468, 473, 476, 478, 460, 1

[56] References Cited

U.S. PATENT DOCUMENTS

| | | |
|---|---|---|
| 4,329,684 | 5/1982 | Monteath et al. . |
| 4,390,901 | 6/1983 | Keiser . |
| 4,488,179 | 12/1984 | Kruger et al. . |
| 4,635,121 | 1/1987 | Hoffman et al. . |
| 4,706,121 | 11/1987 | Young . |
| 5,151,789 | 9/1992 | Young . |
| 5,210,611 | 5/1993 | Yee et al. ................................ 349/473 |
| 5,296,931 | 3/1994 | Na ............................................ 348/371 |
| 5,444,499 | 8/1995 | Saitoh . |

FOREIGN PATENT DOCUMENTS 5-219455  8/1993  Japan .

OTHER PUBLICATIONS

EIA Standard–EIA 608–Sep. 1994 Recommended Practice for Line 21 Data Service.

*Primary Examiner*—Victor R. Kostak
*Assistant Examiner*—Nathan J. Flynn
*Attorney, Agent, or Firm*—Jay H. Maioli

[57] ABSTRACT

A television receiver for receiving a television broadcast signal and tuning in a desired channel to receive a television signal on which a broadcast program of a predetermined genre is broadcast, and that performs the steps of entering a first genre code of a desired program, extracting a second genre code included in the television broadcast signal, making a comparison between the first genre code and the second genre code for all receivable channels, and, if a program corresponding to the first genre code is being broadcast in a plurality of channels, tuning in a channel having a past record of highest frequency of reception.

16 Claims, 12 Drawing Sheets

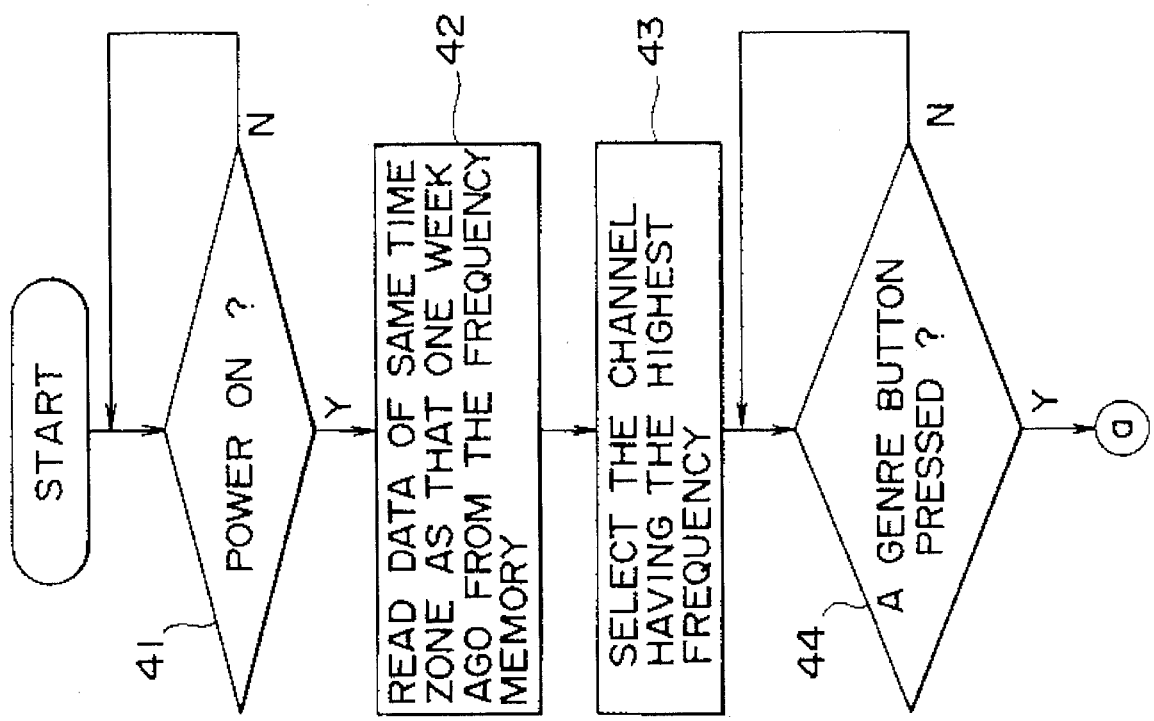

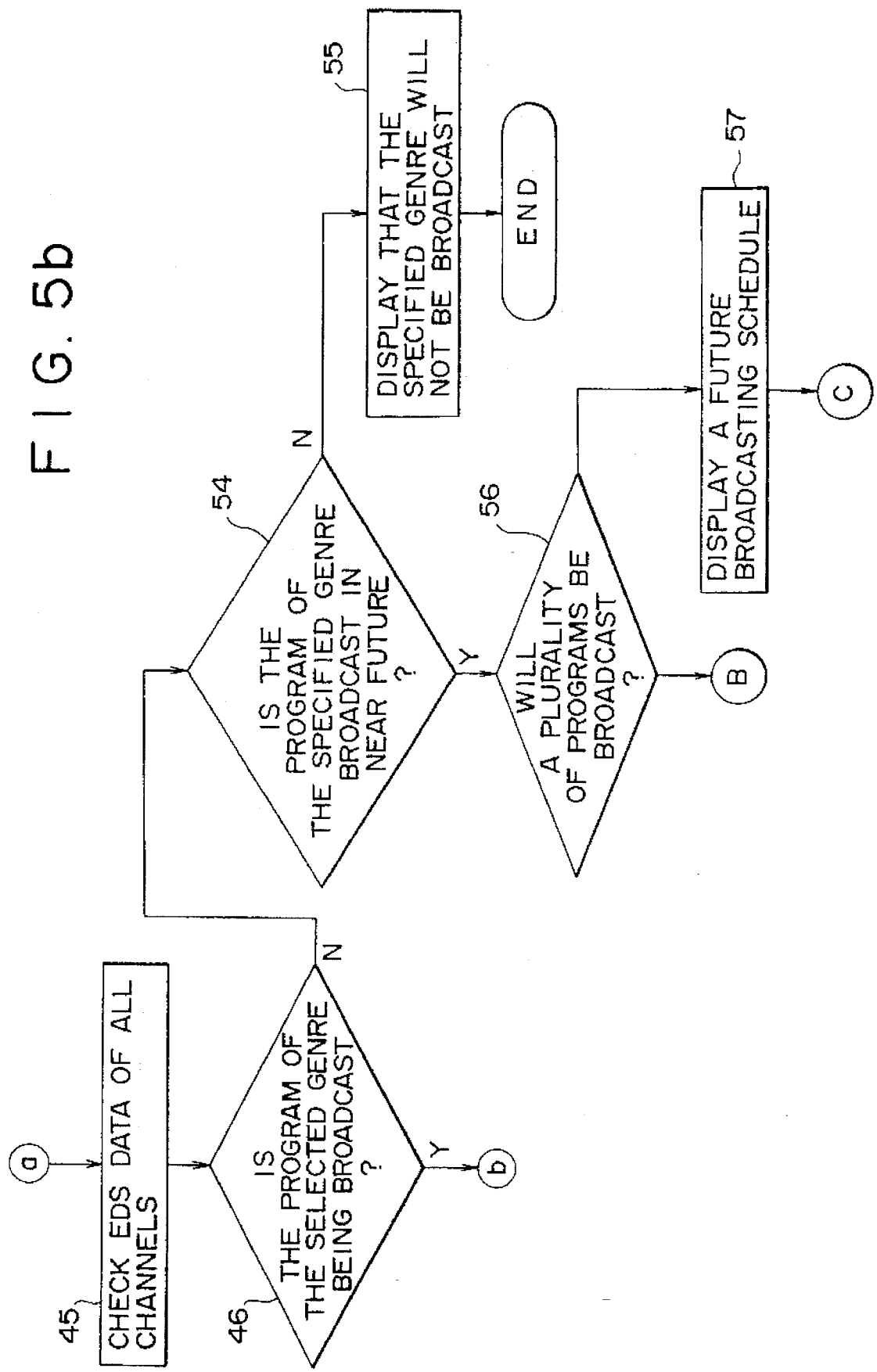

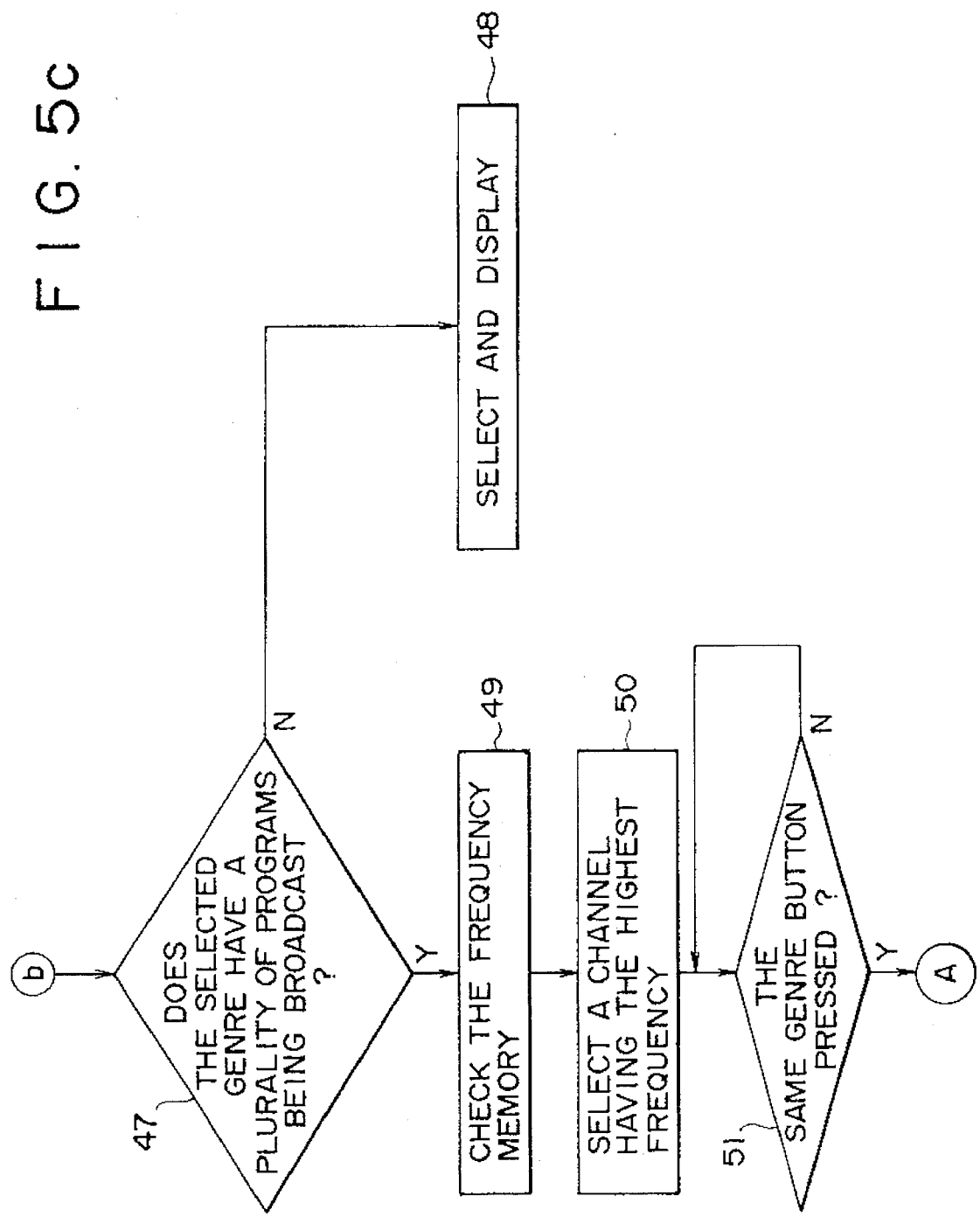

TELEVISION BROADCAST RECEIVER WHICH SELECTS PROGRAMS BY GENRE AND PAST VIEWING HABITS

FIELD OF THE INVENTION

The present invention relates to a television broadcast receiver capable of receiving program broadcast material of a desired genre by automatically tuning to a particular broadcast channel, or channels, based upon past broadcast program reception history.

BACKGROUND OF THE INVENTION

It is common for television users to view television programs of a similar type, or genre, at regularly recurring times of the day, week, or month, for example. Even more particularly, it is common for users to regularly view the same broadcast television programs at, for example, the same time each day, week or month. To tune to a broadcast channel on which a desired television program is broadcast, it is quite common for a user/viewer to resort to manually tuning the television tuner to each of a plurality of available broadcast channels to view the program contents on each broadcast channel so as to determine on which channel a desired television program is broadcast. Alternatively, it is also common for a user/viewer to refer to a printed or otherwise viewable program guide, or schedule, to determine on which broadcast channel, or channels, a desired television program is broadcast and at what time such broadcast occurs.

The aforementioned methods of selecting a broadcast channel/program broadcast for viewing are often adequate where there is a limited number of available broadcast channels. However, as the number of available broadcast channels increases, the aforementioned methods of broadcast channel/program selection become much more cumbersome and time consuming. Further, as the number of available channels increases, a user must either individually tune to each of a plurality of the increased number of available broadcast channels to determine what is broadcast or try to navigate their way thru a large body of program guide/schedule information which details information for each of the available broadcast channels. Both of these methods of broadcast channel selection require more time on the part of the user. Further, the increased size of the program guide data makes referral to such a guide cumbersome as well.

Typical television receivers provide for storing the last viewed, or tuned, broadcast channel so that it may be subsequently tuned to upon next power up. This is very convenient for those viewers who want only to watch the last viewed broadcast channel, however, it does not really provide for those users who want to view television programs which happen to be broadcast on a plurality of differing channels. Tuning devices are available which allow a user to program in data, or program code information, to cause a predetermined television program to be tuned in at a particular time, these types of devices generally require that a user refer to a program guide of the aforementioned type. As the number of available broadcast channels increases the number of program code data also increases, as well as, typically, the length of such data. As a result the programming, or entering, of the requisite program code data is often difficult for inexperienced users.

Previously known television broadcast receiving devices such as that disclosed in Japan Laid open application JP-05-219455 (Laid open date: Aug. 27, 1993) to S. Mitsumasa, which is assigned to the assignee of the present invention, allow for a television receiver to be automatically tuned to a particular broadcast channel based upon a program history which details the frequency of viewing on particular channels at a particular day or time period. These types of receivers however, do not allow for the automatic tuning to a broadcast channel on which a program of a predetermined/selected genre/type is broadcast, based upon a reception history which sets out the broadcast channels on which a program(s) of a predetermined genre/type have been most frequently received in the past.

In view of the above, it is an object of the present invention to provide a tuning device which allows for automatic tuning of broadcast channels on which particular television programs, or types/genre of programs are broadcast based upon user input, or identification of a desired program, or program type.

It is therefore an object of the present invention to provide a tuning method and a tuning apparatus for automatically tuning in a channel/broadcast channel as specified by the user for a particular program or genre of program and, if the specified program/genre exists in plurality, automatically tuning in the channel based on the frequency at which the desired program/genre has been received in the past.

It is another object of the invention to provide a tuning method and a tuning apparatus for relatively easy timer-reservation setting without requiring the user to refer to a program guide/listing or the like.

SUMMARY OF THE INVENTION

According to one aspect of the present invention there is provided a channel tune-in apparatus for receiving a television broadcast signal and tuning in a desired channel, the apparatus includes a remote controller having a plurality of user input keys, or buttons. At least some of these user input keys are associated with a particular television program or program genre/type, and are used to indicate a users desire to view a particular television program or program genre/type. There is also provided a photo-receiver for receiving a control signal from the remote controller, a registration memory for storing program genre code information (genre data) related to each of the programs or program genres associated with each of the genre input keys of the remote controller, an extractor for extracting genre code data (program identification data) from a received television signal, and a comparator for comparing extracted genre code data with genre code data stored in the registration memory and, where the extracted genre code data matches the stored genre code data selecting, or tuning in, the broadcast channel corresponding to the extracted genre data.

In another aspect of the present invention there is provided a frequency memory for storing receiving history data (reception history data) regarding the frequency with which a particular program or programs of a particular genre are viewed on a particular broadcast channel, or channels. This stored frequency data is subsequently referred to automatically select the broadcast channel, or channels, on which a particular desired/selected program genre, or program, has been previously viewed most frequently. Thus allowing a user to tune in a broadcast channel having a desired/selected program or program genre broadcast thereon, based upon the past receiving history.

According to another aspect of the present invention, there is provided a tuning method for receiving a television broadcast signal and tuning in a desired broadcast channel, which includes the steps of entering a first genre code of a desired program, extracting a second genre code (program identification data) from a television broadcast signal, making a comparison between the first genre code and the second genre code for all receivable channels, and, where a program broadcast has an extracted second genre code which matches, or corresponds to, the first genre code, tuning to that broadcast channel. Where there is more than one broadcast channel having an extracted genre code which matches the first genre code, then tuning in the channel having the highest frequency of past receiving history as set out by reception history data stored in memory.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 5A is a flowchart indicating a channel tune-in operation with a genre specified and should be viewed in conjunction with FIG. 5B and 5C;

FIG. 5B is a flowchart indicating a channel tune-in operation with a genre specified and should be viewed in conjunction with FIGS. 5A and 5C;

FIG. 5C is a flowchart indicating a channel tune-in operation with a genre specified and should be viewed in conjunction with FIGS. 5A and 5C;

DETAILED DESCRIPTION OF THE INVENTION

The present invention will be described in further detail with reference to the accompanying drawings.

Figure 1:
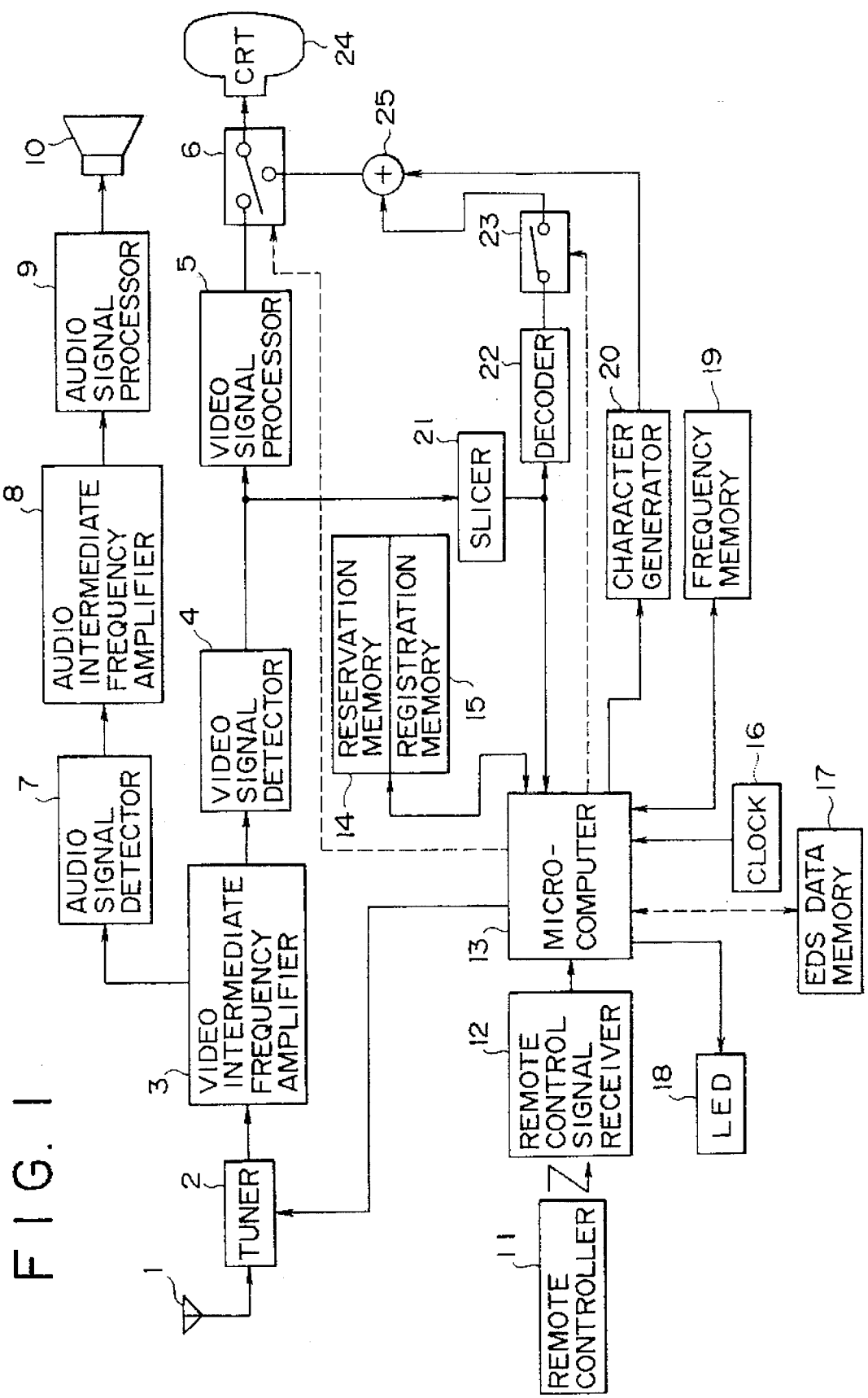
FIG. 1 is a block diagram illustrating a television receiver having a channel-tuning apparatus according to the invention.

With reference to FIG. 1, there is shown a block diagram illustrating a television receiver equipped with the channel tune-in apparatus according to the present invention. In FIG. 1, a television signal coming from a television broadcasting station is received by an antenna 1 and supplied to a tuner 2.

A method, generally referred to as EDS(Extended Data Service), for transmitting data on a television signal has previously been described in Electronic Industries Association(EIA) Standard EIA-608: *Recommended Practice for Line* 21 *Data Service* (September, 1994) which is hereby incorporated herein by reference. EDS data is transmitted via a television signal using two-field 21st line of a vertical blanking interval of the television signal. The EDS data includes data such as start time, elapsed time, broadcasting channel, and a genre of a program currently broadcast or to be broadcast, for example. It should be noted that the transmission of the EDS data is practiced in the United States of America and therefore the following preferred embodiments are not limited to the use of EDS data although some reference is made for illustrative purposes to the EDS data in the following description.

In the tuner 2, a television signal of a desired channel/broadcast channel is tuned in accordance with a tune-in control signal from a microcomputer 13. The television signal of the tuned-in channel is converted by a video intermediate frequency amplifier 3 into a video intermediate frequency signal, which is demodulated by a video signal detector 4 into a video signal. The video signal outputted from the video signal detector 4 is then supplied to a video signal processor 5. The video signal supplied to the video signal processor 5 is separated into a luminance signal component and a color difference signal component. Then, predetermined processing is performed on these separated components. Three primary color signals R, G, and B are formed from the processed signals by a matrix circuit, not shown, to be outputted to a CRT (Cathode Ray Tube) 24 through a switch 6.

In the video intermediate frequency amplifier 3, an audio intermediate frequency signal is separated from the video intermediate frequency signal. The separated audio intermediate frequency signal is demodulated by an audio detector 7 and then amplified by the audio intermediate frequency amplifier 8. The amplified audio intermediate frequency signal undergoes predetermined processing by an audio signal processor 9 and then is output to a speaker 10.

The video signal detector 4 is connected to a slicer 21. Slicer 21 acts to separate EDS information, or the like, from the broadcast signal. The output of the slicer 21 is sent to a decoder 22 and the microcomputer 13.

The microcomputer 13 is connected to a character generator 20. The microcomputer controls a switch 23 to selectively provide EDS information output from the decoder 22 to an adder 25 for adding to character information output from the character generator 20. The selected information from adder 25 is then supplied to the switch 6, thereby controlling the display on the CRT 24.

The microcomputer is also connected to a remote control signal receiver 12 for receiving an infrared signal coming from a remote controller 11 to, a clock 16 for timer reservation, and to an LED (Light Emitting Diode) 18 for indicating that timer reservation is on, or set, thereby allowing the user to give instructions to the tune-in apparatus via remote control signal receiver 12.

The microcomputer 13 is further connected to a reservation memory 14, a registration memory 15, and a frequency memory 19.

The reservation memory 14, the registration memory 15, and the frequency memory 19 are each composed of a nonvolatile memory. The reservation memory 14 stores timer reservation information. The registration memory 15 stores data representing a relationship, or association, between remote controller buttons, or user input keys, and program titles or genres. The frequency memory 19 stores data about the history of reception of broadcast channels and programs, or program genres, selected by the user.

Figure 2:
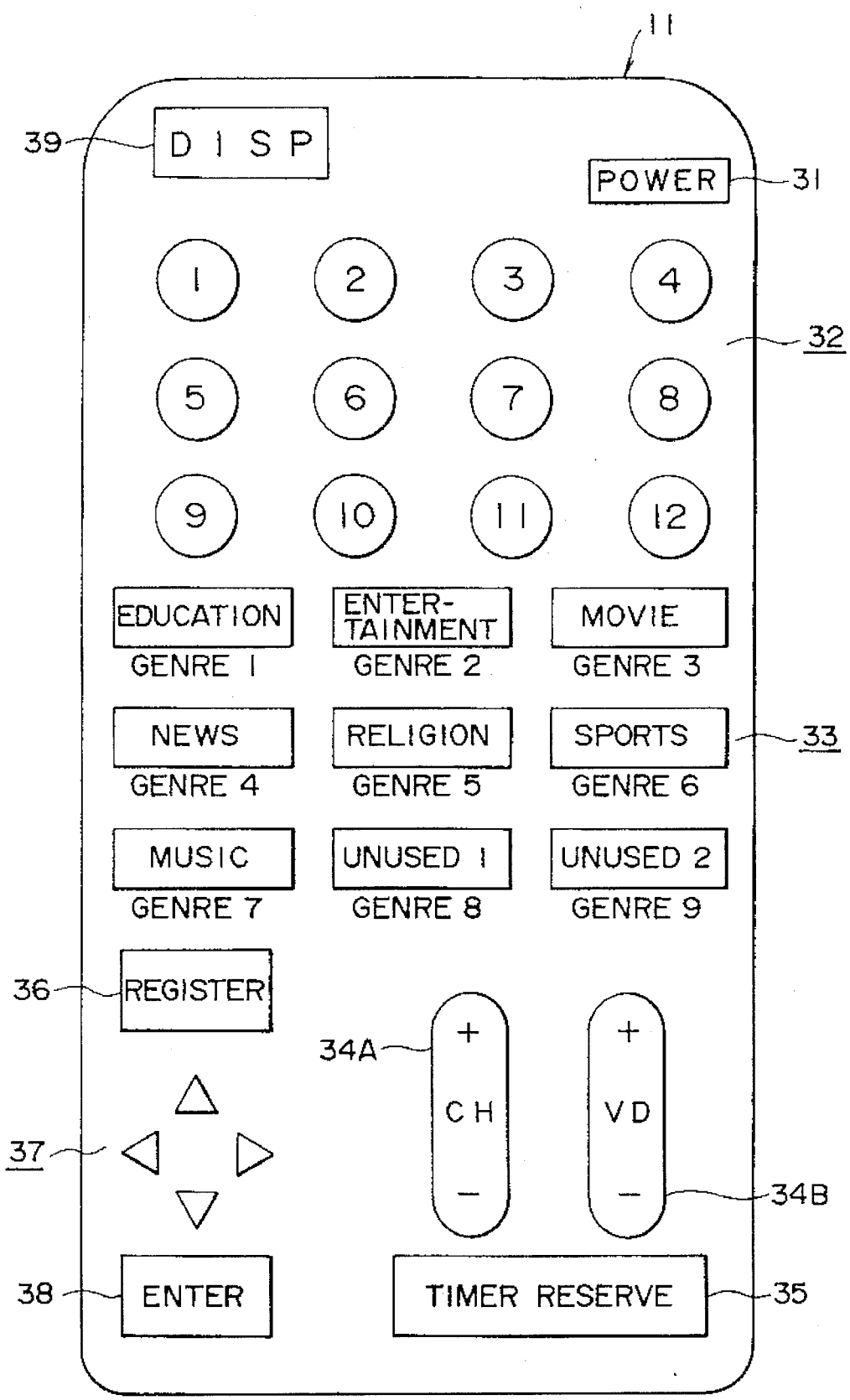
FIG. 2 is a front view of a remote controller.

Referring to FIG. 2, there is shown a front view of the remote controller 11. Reference numeral 31 indicates a power switch for turning on/off the power to the television receiver. Reference numeral 32 indicates a plurality of channel buttons (numbered 1–12). When one of the channel buttons 32 is pressed, or actuated, a corresponding broadcast channel is selected, or tuned in. For example, if channel button 2 is actuated, the broadcast channel 2, or another channel associated with channel button "2" will be tuned in.

Reference numeral 33 indicates a plurality of genre buttons. The genre buttons are each associated with a particular genre/type of program. For example button "genre 1" is associated with the genre of Educational programming. Button "genre 4" is associated with News programming, while button "genre 7" is associated with Music programming. The genre buttons are used to select a program belonging to a desired genre. For example, when a "News" genre button is pressed, only broadcast channels on which news programs are broadcast will be selected/tuned in and displayed on the CRT 24. Unused genre buttons ("Unused 1" and "Unused 2") of the genre button group will be described later.

Reference numeral 34A indicates a channel up/down button. When the "+" side is pressed, the tuner is tuned to channels incrementally, one by one; when the "−" side is pressed, the tuner is tuned to channels decrementally, one by one. Reference numeral 34B indicates a volume control button. When the "+" side of the volume control button is pressed, volume is increased; when the "−" side of the volume button is pressed, volume is decreased.

Reference numeral 35 indicates a timer reservation button. The timer reservation button 35 is used for timer reservation setting. Reference numeral 36 indicates a registration button. The registration button 36 is used to set, or associate, genres or programs with the unused (user assignable) genre buttons "genre 8" and "genre 9". Reference numeral 37 indicates cursor control buttons. The cursor control buttons are used along with the registration button 36 to set genres to the genre unused buttons. In the preferred embodiment available genres, or program names/titles can be displayed on the display 24. By using the cursor control keys 37, a cursor appearing on the display 24 may be moved across the display to highlight or select the genre, or program name, which the user desires to associate with, or assign to, the unused genre buttons.

Reference numeral 38 indicates an enter button. The enter button 38 is used to enter a new genre selected by the registration button 36 and the cursor buttons 37 and a timer reservation made by the timer reservation button 35. A display button 38 is used to display information received in EDS to the CRT 24 and will be described later in detail.

Figure 6A:
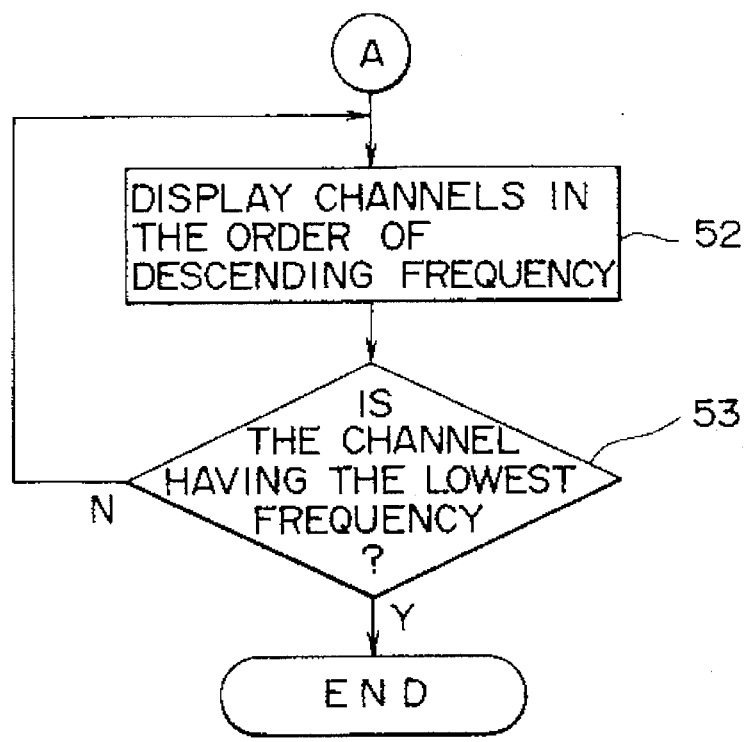
FIG. 6A is a flowchart continued from the flowchart of FIG. 5C.
Figure 6:
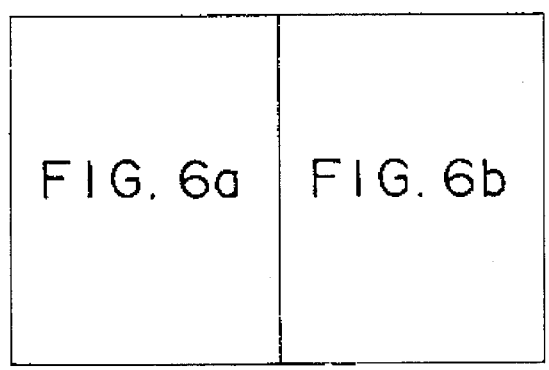
FIG. 6B is a flowchart continued from the flowchart of FIG. 5B.
Figure 6B:
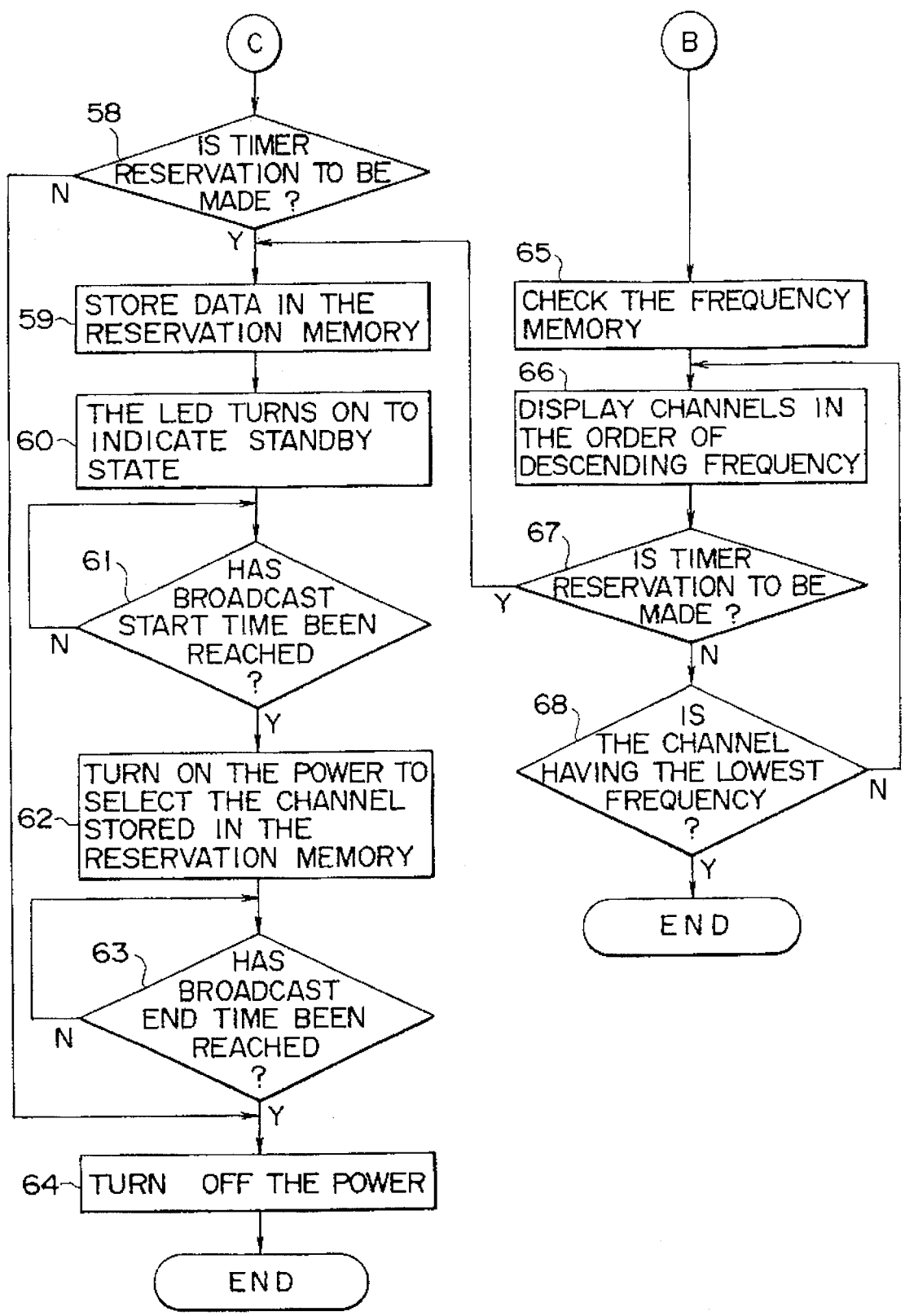

Now, a tune-in operation based on genre specification will be described with reference to FIGS. 1, 2, 5, and 6. FIGS. 5 and 6 are flowcharts that indicate an operation of the microcomputer 13 at for setting channel tune-in and timer reservation and based on genre specification. First, the microcomputer 13 detects that the television receiver has been turned on (step 41). A channel frequently viewed within, for example, one week before in the generally same time zone, or period, is read from the frequency memory 19 and selected, or tuned in, automatically (steps 42, 43). Thus, channel selection based on reception frequency data is performed. Namely, upon powering on the television receiver, the most frequently viewed channel is automatically selected.

Then, if the channel selected first is found not to contain a desired program, the user performs direct tune-in (namely, tuning in a desired channel by entering a channel number corresponding to a desired channel through the remote controller), or operates the channel up/down button 34A, or specifies a genre of a desired program via genre buttons 33. The direct tune-in and the tune-in by means of the channel up/down button will not be described because these operations are the same as with the conventional art.

Of the above-mentioned three tune-in methods, it is supposed that the tune-in by genre specification is performed. For example, if a "Sports" genre button (FIG. 2) is pressed (step 44), EDS data about the current channel is extracted by the slicer 21 connected to the video signal detector 4. The extracted EDS data is temporarily stored in the microcomputer 13. This processing is performed on all available channels sequentially (step 45). Based on the stored EDS data, the microcomputer 13 determines whether the program of the genre specified by the genre button is being broadcast or not (step 46). If the microcomputer 13 determines that the program belonging to the specified genre is being broadcast only in one channel (step 47), the microcomputer 13 switches the tune-in control signal for the tuner 2, thereby outputting the program of the specified genre to the CRT 24 (step 48).

Figure 3:
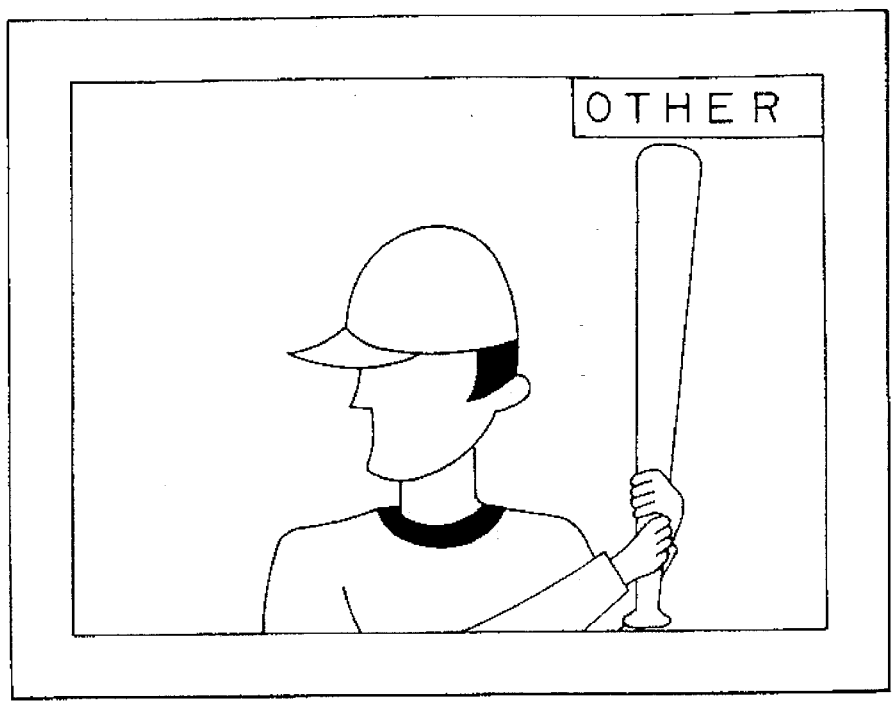
FIG. 3 shows a screen displayed when a channel is tuned in with a genre specified.

If there are a plurality of programs of the specified genre (step 47), a message (OTHER) as shown on the CRT 24 of FIG. 3 is displayed. This "OTHER" message is generated by the character generator 20 connected to the microcomputer and displayed on the CRT 24 when the switch 6 is switched by the microcomputer 13. This message tells the user that a sports program is being broadcast on other channels. This message disappears after a predetermined period of time. If a plurality of sports programs are being broadcast, the microcomputer 13 checks the frequency memory 19 connected thereto (step 49) and selects a channel having the highest reception frequency (step 50). The frequency memory 19 stores reception frequency data about programs viewed in the past, classified by day of the week and time zone, or period. If the sports program first displayed on the CRT is not a desired program, the user presses the same genre button ("Sports" in this case) for example again (step 51) to select a program having a second higher reception frequency. If programs of the specified genre are being broadcast on three channels for example, the operation of step 51 can be repeated twice (steps 52, 53). It should be noted that in the preferred embodiment, this channel switching operation can be performed only while the above-mentioned message is on display since such display correlates to the genre select mode. It should also be noted that in the preferred embodiment the reception frequency data stored in the frequency memory 19 can be updated only if a particular program is selected for some predetermined minimum period of time, for example, 10 minutes or more.

If no sports program is being broadcast when a genre button ("Sports" for example) on the remote controller is pressed, it is determined whether a sports program will be broadcast within a predetermined upcoming period of time, for example, within the next several hours (step 54). This determination is made based on the EDS data of each channel read and stored by the microcomputer 13. The EDS provides information about program broadcasting schedule upcoming for the next several hours. If it is determined that no sports program will be broadcast within the next several hours, a message indicating that no program of the specified genre is scheduled for broadcasting is displayed (step 55).

Figure 4:
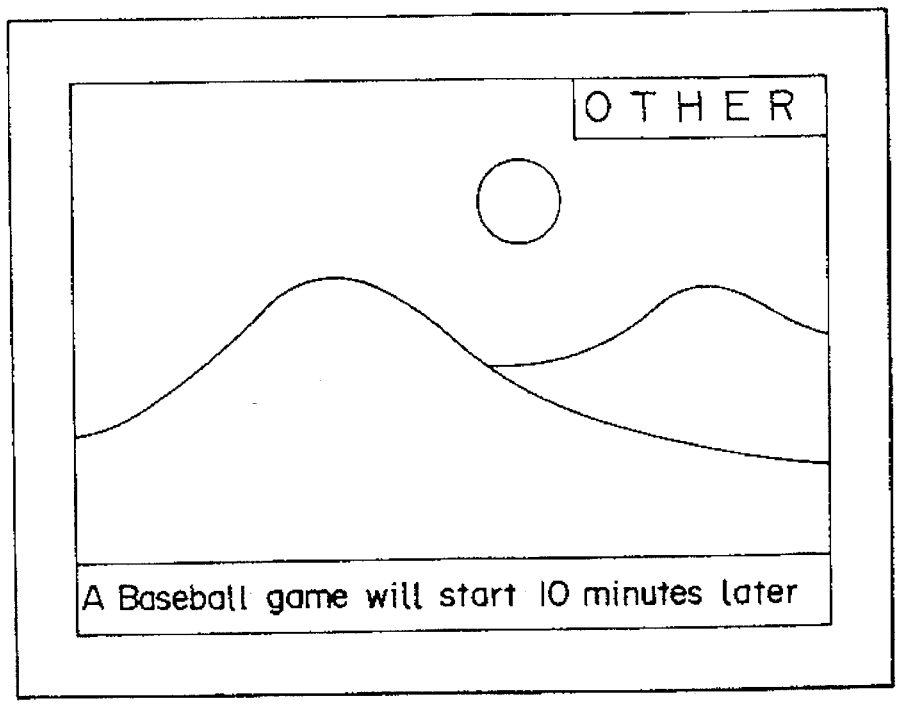
FIG. 4 shows a screen depicting a time at which a program scheduled to be broadcast starts.

If a sports program will be broadcast within, for example, the next several hours, the EDS data determined by the microcomputer 13 is supplied to the decoder 22 to be decoded. At generally the same time, a decode on/off switch 23 is turned on by the microcomputer, upon which the decoded data is supplied to the adder 25. An output of the adder 25 is outputted to the CRT 24 via the switch 6o An example of a screen of the data displayed on the CRT 24 is shown in FIG. 4. As seen from FIG. 4, if there is only one program that belongs to the specified genre, the CRT 24 displays a message telling how many minutes (or hours) from now the program will be broadcast (step 57). If programs that belong to the specified genre are scheduled for broadcasting on a plurality of channels (step 56), the contents of the frequency memory are checked (step 65) and these channels are sequentially displayed, from a channel having the highest past reception frequency to a channel having the lowest past reception frequency, each time the genre button is pressed (steps 66, 68). When a desired program is displayed, the user presses the timer reservation button 66 for setting timer reservation to be described later (step 67). In this example, the data coming via the EDS is decoded and the decoded data is displayed on the CRT 24. It will be apparent to those skilled in the art that the microcomputer includes circuitry for reading the EDS data and causing the character generator to display a message on the CRT such as shown in FIG. 4.

Now, the setting of timer reservation will be described with reference to FIGS. 5 and 6. The setting of timer reservation is performed in the case where no program of the specified genre is found being broadcast by the above-mentioned genre-specified tune-in operation and a program of the specified genre is found to be broadcast within several hours. In this case, the above-mentioned message setting out how hours, minutes or seconds (or in the alternative, the actual time) until a program of the selected genre starts to be broadcast is displayed (step 57) and it is determined whether the program is to be timer-reserved or not (step 58). To timer-reserve the program identified to be broadcast, the user presses the timer reservation button on the remote controller. This stores broadcast start and end times and a corresponding channel number into the reservation memory 14 (step 59), completing the timer reservation operation. The LED 18 disposed on the television receiver to indicate that timer reservation is on is turned on, upon which the television receiver enters a standby state (step 60). Then, the broadcast start time stored in the reservation memory 14 is compared with a time of the clock 16 (step 61). If a match is found, the power to the television receiver is turned on and the stored channel is tuned in (step 62). After a certain time, the stored broadcast end time is compared with a time of the clock 16 (step 63). If a match is found, the power to the television receiver is turned off.

If programs of the specified genre are scheduled for broadcasting on a plurality of channels, the frequency memory 19 is checked as mentioned above (step 65) and the broadcast schedule of a channel having the highest reception frequency is displayed first (step 66). In this case, too, a message such as shown in FIG. 4 is displayed, telling the user that programs of the specified genre are also scheduled to be broadcast on other channels. Each time the user presses the same genre button, a broadcast schedule on a channel having a lower reception frequency is displayed. If a program to be timer-reserved is found while pressing the genre button, the user then presses the timer reservation button 35 (step 67). This stores program start and end times and a corresponding channel number into the reservation memory 14 (step 59), completing the timer reservation operation. Subsequent operations are the same as those mentioned above. If no timer reservation is made, it is determined in step 68 whether a broadcast schedule on a channel having the lowest reception frequency has been displayed or not. If such a broadcast schedule has been displayed, the processing terminates. If there is a broadcast schedule on a channel having a still lower reception frequency, the processing of step 66 and so on is repeated.

In the above-mentioned case, programs scheduled for broadcasting include a program of a genre specified by the user and the user determines whether the desired program is to be timer-reserved or not. It will be apparent that the timer reservation may be made automatically. Also, in the above-mentioned case, the clock 16 is used to compare program start and end times stored in the reservation memory 14 with times of the clock 16. It will be apparent to those skilled in the art that the comparison may be made by using time information sent with the EDS data. It will also be apparent that, if there is a change in a broadcasting time due to some change in the reserved program, the power to the television set may be turned on at the predetermined program start time stored in the reservation memory 14, thereby providing recognition that the broadcasting time has changed by comparing a genre of the program currently broadcast with a genre stored in the reservation memory 14. In this case, a message indicating the change in the program broadcast time may be displayed. Further, when a program start time stored in the reservation memory 14 has been reached, a genre of a stored program is compared with a genre of the currently broadcast program. If a match is found, the power to the television receiver is turned on; if no match is found, the comparison is repeated until a match is found, upon which the power is turned on. This allows the user to view a specified program if a change occurred in the broadcasting time of the program.

In the above-mentioned case, the EDS data is read when a genre button on the remote controller 11 is operated. It will be apparent that an EDS data memory 17 may be provided on the microcomputer 13. In such a case, when the television receiver is in the standby state, the EDS data of each channel is always read by the microcomputer 13 to be stored in the EDS data memory 17. This allows the microcomputer to readily read the EDS data of each channel when the television receiver is powered on.

Figure 7:
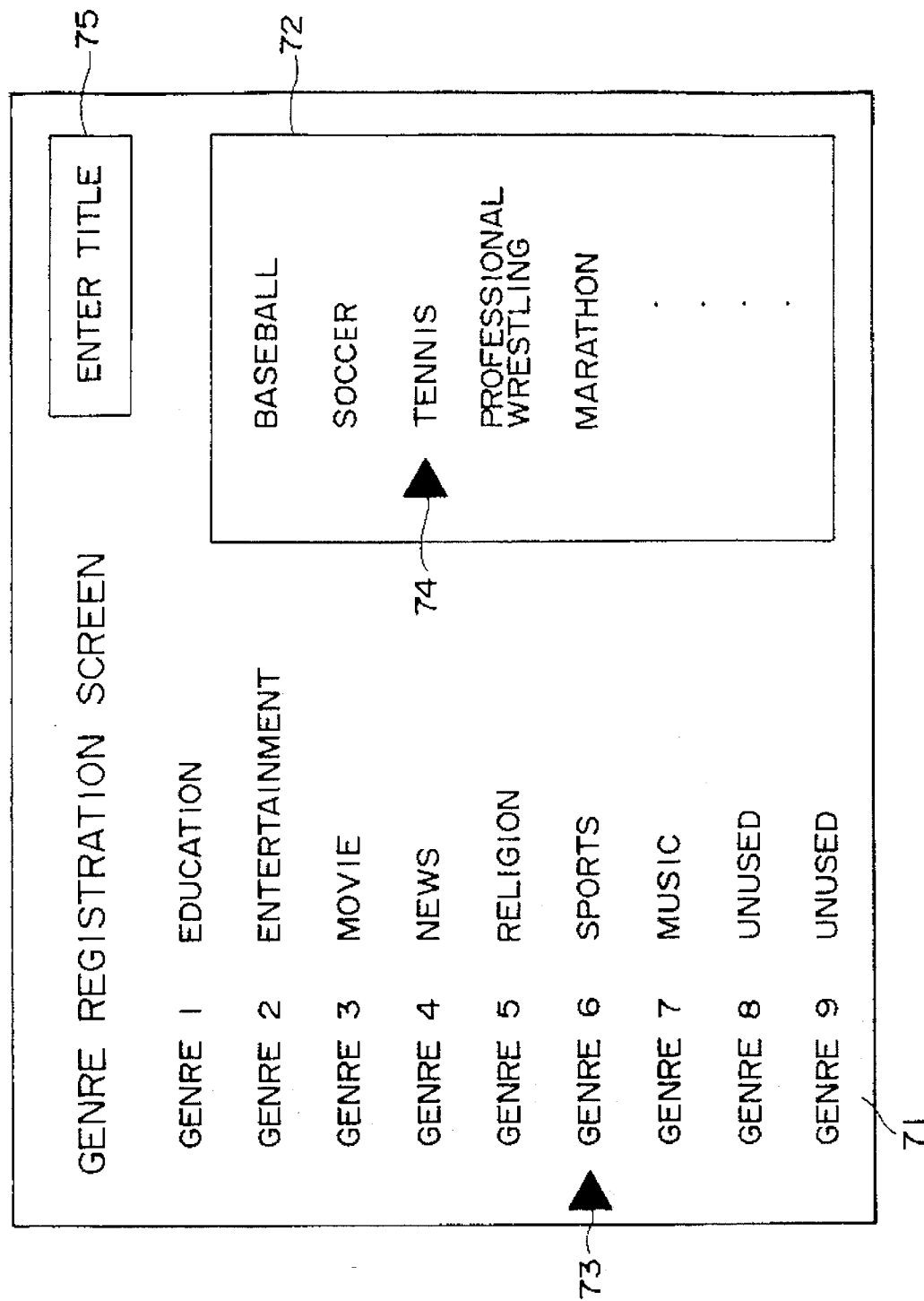
FIG. 7 shows a screen for registering a program genre.
Figure 8:
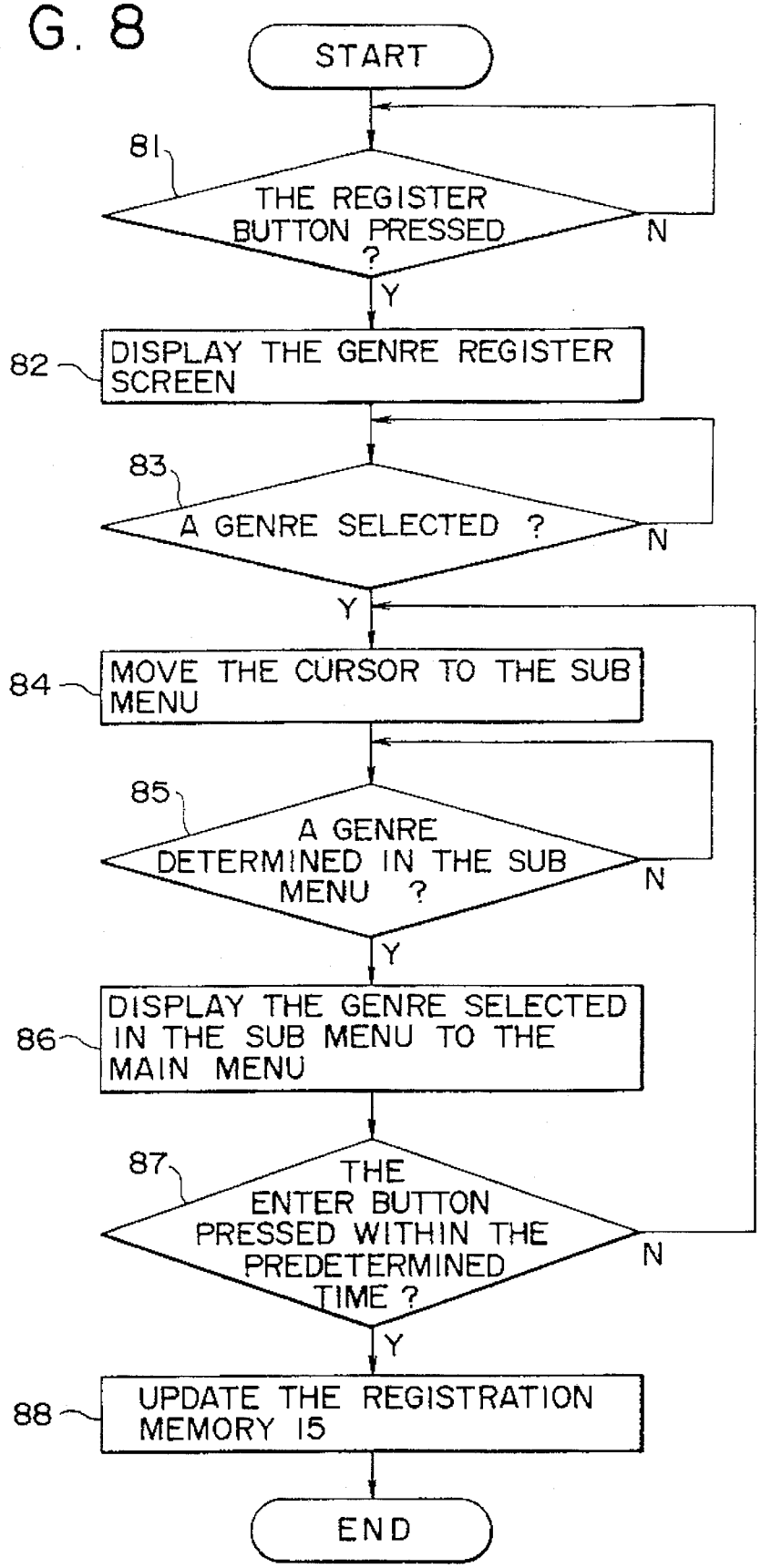
FIG. 8 is a flowchart illustrating an operation for newly registering a genre.

In what follows, a method of registering a new genre in an unused genre button will be described with reference to FIGS. 7 and 8. FIG. 7 shows a genre registration screen as displayed on the CRT 24. FIG. 8 is a flowchart indicating an operation for registering a new genre in the remote controller.

Referring to FIG. 8, when the registration button 36 is pressed (step 81), a main menu screen 71 of the genre registration screen (FIG. 7) is displayed on the CRT 24 (step 82). The user moves a cursor 73 to a desired genre by pressing a corresponding genre button 33 or the cursor button 37. When the cursor is positioned to the desired genre, the user presses the enter button 38. Thus, the desired genre (one of genres 0 through 9) displayed on the main menu 71 is selected (in this case, genre 6 "Sports" is selected for example). In step 83, it is determined whether a particular genre has been selected or not.

When one genre has been selected, a sub menu screen 72 is displayed on the CRT 24. At the same time, the cursor 73 in the main menu screen moves into the sub menu screen 72 as a cursor 74 (step 84). On the sub menu screen 72, names of unregistered genres are displayed. The user selects one of these genres in the same manner as mentioned above (step 85).

When the user selects one of the genres ("Tennis" for example) in the sub menu screen, "Tennis" is displayed in the above-selected genre 6 of the main menu screen (step 86). In step 87, it is determined whether the enter button has been pressed or not. If the enter button has not been pressed within a predetermined period of time, "Tennis" in the main menu screen is erased and the cursor 73 moves into the sub menu screen 72 as the cursor 74 (step 84). If the enter button has been pressed, the information stored in the registration memory 15 is updated (step 88). It should be noted that the registration memory 15 stores the relationship between the code signal and genre received from the remote controller 11.

Figure 9:
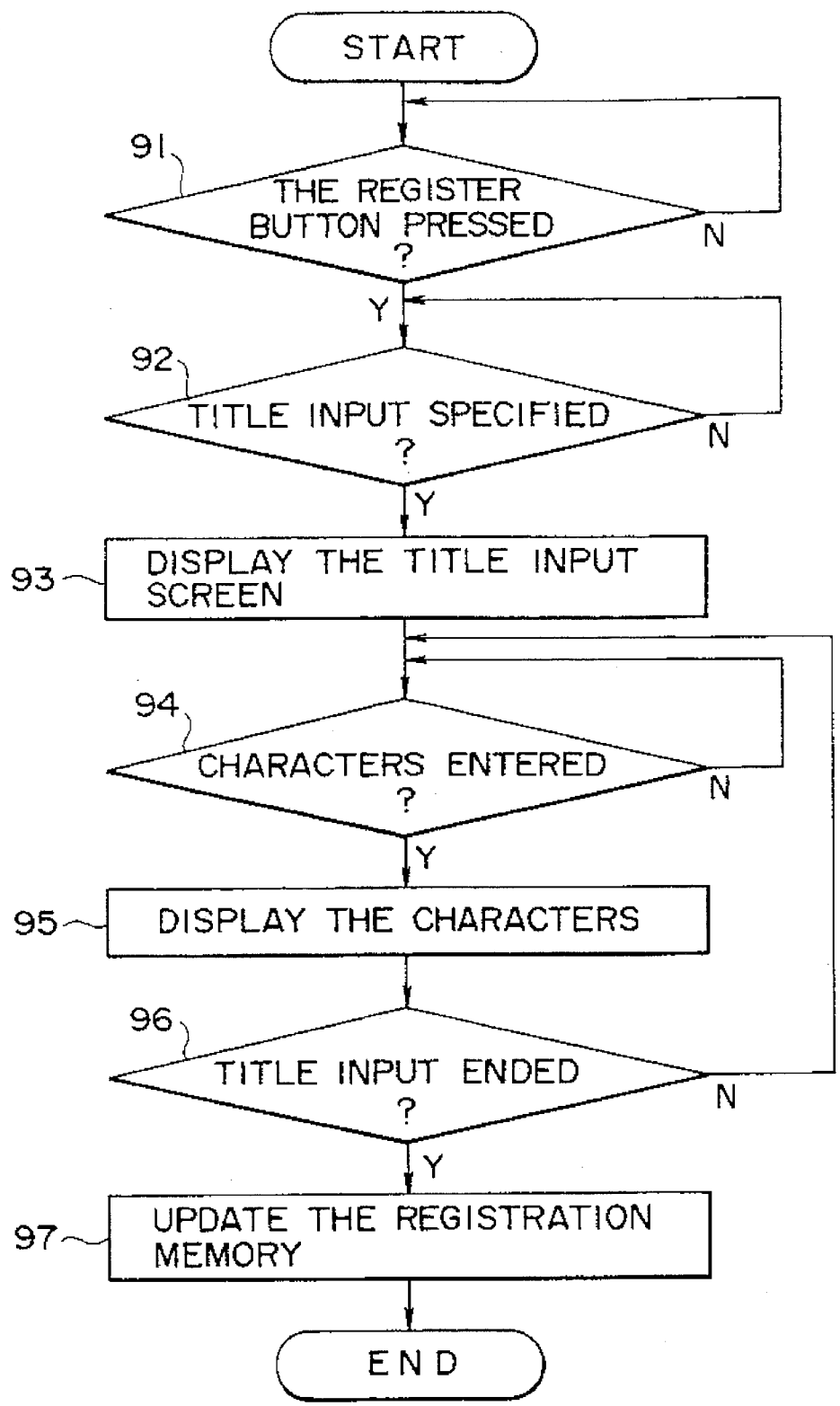
FIG. 9 is a flowchart illustrating an operation for registering a program title into a genre button.
Figure 10:
FIG. 10 is an illustration showing an example of a display screen for entering a title.

In what follows, an operation for registering a title name of a program as a genre will be described with reference to FIGS. 9 and 10. Before making title name registration, the user must display the screen of FIG. 7, move the cursor 73 to "Title input" icon 75 in the upper right corner of the screen, and press the enter button 38 to display a title input screen of FIG. 10 (steps 92, 93). Now, the user can enter characters representing a title name in the title input screen (step 94). The entered characters are displayed in an upper portion of the screen as a title name (step 95). When all the characters have been entered, the user moves a cursor 100 to "End" icon in the lower right of the screen and presses the enter button 38. Thus the title name has been registered (step 96). When the title name registration has been completed, the data in the registration memory 15 is updated.

To display the registered program title name, the user presses a display button 30 on the remote controller 11 twice and a list of registered titles is displayed. If a genre button is registered with a title name, the title name is compared with a program title name sent by EDS and a matching channel is tuned in. If there is no program having a program title corresponding to a program currently being broadcast, the title name is compared with a title name of a program scheduled for broadcasting within coming several hours. If there is such a program, timer reservation may be made in the above-mentioned manner. It should be noted that a title that is too long cannot be registered because of a limited storage size of the registration memory 15. Therefore, the first eight characters, for example, of a title are registered and a forward matching is performed with a title received in the current or scheduled broadcasting to determine whether the entered title corresponds to a specified title.

In the above-mentioned case, the EDS format is used to describe the channel tuning-in and timer reservation operations with a genre specified. It will be apparent that the invention is not limited thereto but applicable to many other formats as far as the information about a program currently broadcast or scheduled for broadcasting including genre code, title name, and program start and end times is sent to the television receiver. For example, this invention is applicable to character superimposed broadcasting and tele-text broadcasting.

It should be noted that the television receiver referred to in the above description denotes any electronic apparatus that can receive television broadcasting, including a video tape recorder for example. It will be also apparent that the above-mentioned timer reservation is also applicable to timer recording reservation for a video tape recorder.

While the preferred embodiments of the present invention have been described using specific terms, such description is for illustrative purposes only, and it is to be understood that changes and variations may be made without departing from the spirit or scope of the appended claims. All such variations or changes are fully contemplated by the following claims.

What is claimed is:

1. A channel tune-in method for use on a television receiver for receiving a television broadcast signal and tuning in a desired channel, comprising the steps of:
   entering a first genre code of a desired program and extracting a second genre code included in said television broadcast signal;
   making comparison between said first genre code and said second genre code for all receivable channels; and
   if a program corresponding to said first genre code is being broadcast on a plurality of channels, tuning in a channel having a highest reception frequency in a past reception history.

2. A channel tune-in method as defined in claim 1, wherein said first genre code is entered by means of a remote controller.

3. A channel tune-in method as defined in claim 2, wherein, if no program corresponding to said first genre code and being broadcast is found by said comparison, said first genre code is compared with a program scheduled for broadcasting and, if a program scheduled for broadcasting is found, broadcasting schedule information is displayed.

4. A channel tune-in method as defined in claim 3, wherein, if no program corresponding to said first genre code and being broadcast is found by said comparison, said first genre code is compared with a program scheduled for broadcasting and, if a program scheduled for broadcasting is found, said program scheduled for broadcasting is timer-reserved.

5. A channel tune-in apparatus for tuning in a desired channel by receiving a television broadcast signal, comprising:
   a remote controller having a plurality of buttons with program genres registered;
   a photo receiver for receiving a control signal coming from said remote controller;
   a registration memory for storing a first genre code corresponding to said control signal;
   extracting means for extracting a second genre code at least included in the television broadcast signal;
   comparing means for comparing said first genre code with said second genre code;
   control means for tuning in a channel for which a match has been found in said comparing means; and
   a frequency memory for storing reception history information, wherein, if a plurality of matching channels have been found as a result of the comparison by said comparing means, data stored in said frequency memory is read to tune in a channel having a highest reception frequency.

6. A channel tune-in apparatus as defined in claim 5, wherein, if it has been found, as a result of the comparison by said comparing means, that no matching channel is being broadcast and a program scheduled for broadcasting has been found matching, at least a start time of said program scheduled for broadcasting is displayed on an externally connected display apparatus.

7. A channel tune-in apparatus as defined in claim 6, wherein, if it has been found, as a result of the comparison by said comparing means, that no matching channel is being broadcast and a program scheduled for broadcasting has been found matching, said program schedule for broadcasting is timer-reserved.

8. A channel tune-in apparatus as defined in claim 7 further comprising rewriting means for rewriting information in said registration memory to allow a user to register a relationship between the control signal stored in said registration memory and a program genre into what the user desires.

9. A channel tune-in apparatus as defined in claim 8 further comprising input means for entering a program name to store a relationship between said control signal and said program name into said registration memory.

10. A television tuning apparatus comprising:

a tuner for receiving a program broadcast via a television broadcast signal broadcast via any one of a plurality of available broadcast channels;

a user input device for providing a user input signal to a controller;

said user input device comprises a plurality of genre input keys for selecting program broadcast material of a predetermined genre;

first storage memory for storing genre identification data uniquely associated with each of said genre input keys;

second storage memory for storing reception history data;

third storage memory for storing data identifying a broadcast channel;

said reception history data comprises data identifying a number of times a program broadcast of a particular genre has been received on a particular broadcast channel within a past predetermined period of time;

extraction circuitry for extracting program identification data from said television broadcast signal;

comparator for comparing said extracted program identification data with said genre identification data stored in said first storage memory and where said genre identification data and said genre identification data match, causing data identifying a broadcast channel on which said television broadcast signal is transmitted to be stored into said third memory; and controller for controlling said tuner to receive a television broadcast signal on a broadcast channel identified by said data stored in said third memory.

11. A television tuning apparatus according to claim 10 wherein said program identification data comprises EDS data.

12. A television tuning apparatus according to claim 10 wherein said extractor circuitry comprises a slicer circuit.

13. A television tuning apparatus according to claim 10 wherein said user input device comprises a remote controller;

said remote controller further comprises means for transmitting an infrared user input signal.

14. A television tuning apparatus comprising:

a tuner for receiving a program broadcast via a television broadcast signal broadcast via any one of a plurality of available broadcast channels;

a user input device for providing a user input signal to a controller;

said user input device comprises a plurality of genre input keys for selecting a program broadcast of a predetermined genre;

first storage memory for storing genre identification data uniquely associated with each of said genre input keys;

second storage memory for storing reception history data;

said reception history data comprises data identifying a number of times a program broadcast of a particular genre has been received on a particular broadcast channel within a past pre-determined period of time;

extraction circuitry for extracting program identification data from said television broadcast signal;

comparator for comparing said extracted program identification data with said genre identification data stored in said first storage memory; and controller for controlling said tuner to tune to a broadcast channel on which said television broadcast signal is broadcast where said comparator determines that said extracted program identification data and said genre identification data match.

15. A method of tuning a television receiver to a broadcast channel to receive a television signal on which a broadcast program of a predetermined genre is broadcast, said method comprising the steps of:

storing genre data into a first storage memory;

storing reception history data in a second storage memory;

extracting program identification data from a television broadcast signal;

comparing said extracted program identification data with said genre data stored in said first storage memory;

where said extracted program identification data and said genre data stored in said first storage memory match, storing data identifying a particular broadcast channel into a third storage memory; and tuning said television receiver to receive a broadcast channel identified by data stored in said third storage memory which corresponds to a broadcast channel identified by said reception history data stored in said second storage memory as having been most frequently received within a predetermined past period of time.

16. A method of tuning a television receiver to a broadcast channel to receive a television signal on which a broadcast program of a predetermined genre is broadcast, said method comprising the steps of storing genre data into a first storage memory;

storing reception history data in a second storage memory;

extracting program identification data from a television broadcast signal;

comparing said extracted program identification data with said genre data stored in said first storage memory; and where said extracted program identification data and said genre data stored in said first storage memory match, tuning said receiver to a broadcast channel identified by said program identification data.

* * * * *